United States Patent
Blair, II

(10) Patent No.: US 10,546,328 B2
(45) Date of Patent: Jan. 28, 2020

(54) IN-STORE NAVIGATION SYSTEMS AND METHODS

(71) Applicant: Walmart Apollo, LLC, Bentonville, AR (US)

(72) Inventor: Richard M. Blair, II, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 223 days.

(21) Appl. No.: 15/667,104

(22) Filed: Aug. 2, 2017

(65) Prior Publication Data

US 2018/0040037 A1 Feb. 8, 2018

Related U.S. Application Data

(60) Provisional application No. 62/370,832, filed on Aug. 4, 2016.

(51) Int. Cl.
*G06Q 30/02* (2012.01)
*G01C 21/20* (2006.01)
(Continued)

(52) U.S. Cl.
CPC ....... *G06Q 30/0281* (2013.01); *G01C 21/206* (2013.01); *G06Q 30/0641* (2013.01); *H04W 4/029* (2018.02)

(58) Field of Classification Search
CPC .......... G06Q 30/0281; G06Q 30/0641; H04W 4/029; G01C 21/206
See application file for complete search history.

(56) References Cited

U.S. PATENT DOCUMENTS 5,573,078 A * 11/1996 Stringer .................. B60K 1/00
 180/11
6,671,618 B2 12/2003 Hoisko
(Continued)

FOREIGN PATENT DOCUMENTS

WO 2007105937 A1 9/2007
WO 2014099004 A1 6/2014

OTHER PUBLICATIONS

Colin Jeffrey, "Shape-shifting navigation device points you in the right direction," GizMag.com, Aug. 31, 2015.
(Continued)

*Primary Examiner* — Russell Frejd
(74) *Attorney, Agent, or Firm* — Schmeiser, Olsen & Watts LLP; Timothy P. Collins

(57) ABSTRACT

A system for navigating a shopper in a store comprises a mobile device application that is stored at and executed by a mobile computing device; an electronic device in communication with the mobile device application, wherein at least one of the mobile device application and the electronic device receives location data for determining directions and a proximity to an item of interest and processes a predetermined feedback pattern for use by the at least one of the electronic device and the mobile device application and generated according to an established location of the at least one of the mobile electronic device and the electronic device, and wherein the feedback pattern is constructed and arranged to provide an indicator of both a direction to the item and a proximity from the item; and a store navigation system that provides instructions for generating the feedback pattern.

18 Claims, 6 Drawing Sheets

(51) Int. Cl.
*G06Q 30/06* (2012.01)
*H04W 4/029* (2018.01)

(56) References Cited

U.S. PATENT DOCUMENTS

| | | | |
|---|---|---|---|
| 8,838,387 B2 | 9/2014 | Larmo et al. | |
| 9,008,859 B2 | 4/2015 | Herzog et al. | |
| 9,202,353 B1 | 12/2015 | Sisbot et al. | |
| 2006/0149621 A1* | 7/2006 | Do | G06Q 20/343 |
| | | | 705/14.58 |
| 2008/0245863 A1* | 10/2008 | Buchheit | G06Q 30/02 |
| | | | 235/383 |
| 2013/0215116 A1* | 8/2013 | Siddique | G06Q 30/0643 |
| | | | 345/420 |
| 2014/0164124 A1* | 6/2014 | Rhoads | H04W 4/02 |
| | | | 705/14.58 |
| 2014/0244207 A1* | 8/2014 | Hicks | G01C 3/00 |
| | | | 702/150 |
| 2014/0285338 A1* | 9/2014 | Davis | H04W 4/023 |
| | | | 340/539.13 |
| 2015/0199566 A1 | 7/2015 | Moore et al. | |
| 2015/0324646 A1* | 11/2015 | Kimia | G06T 7/80 |
| | | | 348/62 |
| 2016/0033280 A1 | 2/2016 | Moore et al. | |
| 2016/0075177 A1* | 3/2016 | Biderman | B60L 3/003 |
| | | | 301/6.5 |
| 2016/0078278 A1 | 3/2016 | Moore et al. | |
| 2016/0179199 A1* | 6/2016 | Levesque | G06F 3/011 |
| | | | 340/407.2 |
| 2016/0194018 A1* | 7/2016 | Falcaro | B62B 1/20 |
| | | | 280/47.24 |
| 2016/0196603 A1* | 7/2016 | Perez | G06K 9/00671 |
| | | | 345/633 |
| 2016/0232624 A1* | 8/2016 | Goldberg | G06Q 30/02 |
| 2017/0059353 A1* | 3/2017 | Madine | G01C 21/3694 |

OTHER PUBLICATIONS

"Navigate Paris," WearableExperiments.com, accessed on Sep. 22, 2015.

Utility U.S. Appl. No. 15/710,185, filed Jan. 19, 2017; 20 pages.

* cited by examiner

US 10,546,328 B2

IN-STORE NAVIGATION SYSTEMS AND METHODS

RELATED APPLICATIONS

This application claims the benefit of U.S. Provisional Patent No. 62/370,832, filed Aug. 4, 2016, entitled "In-Store Navigation Systems and Methods," the contents of which are incorporated by reference herein in their entirety.

FIELD

The present concepts relate generally to directing electronic device users to a location of interest, and more specifically, to the navigation of store customers or associate to a location of interest in a store.

BACKGROUND

Store customers often require directions to locate items of interest. Visual tools, such as maps, global positioning system (GPS) locator services, or the like require the customer to view a display of a mobile electronic device such as a smartphone, which is cumbersome when the customer is also pushing a shopping cart or performing other shopping-related activities.

BRIEF SUMMARY

In one aspect, a system for navigating a shopper in a store, comprises a mobile device application that is stored at and executed by a mobile computing device; an electronic device in communication with the mobile device application, wherein at least one of the mobile device application and the electronic device receives location data for determining directions and a proximity to an item of interest and processes a predetermined feedback pattern for use by the at least one of the electronic device and the mobile device application and generated according to an established location of the at least one of the mobile electronic device and the electronic device, and wherein the feedback pattern is constructed and arranged to provide an indicator of both a direction to the item and a proximity from the item; and a store navigation system that provides instructions for generating the feedback pattern, and the mobile device application in response establishes a communication with the electronic device to establish the feedback pattern.

In some embodiments, the store navigation system comprises: a search processor that searches for an availability and a location of the item of interest; a pattern generator that provides customizes the feedback pattern for different directions or commands; a shopping list processor that provides a plurality of items including the item of interest, each of which has a location which is used to generate the feedback pattern; a lookup module that determines an availability and a location of the item of interest; and a distance determination processor that compares the location of the item of interest and the established location of the mobile electronic device to produce a distance result that is used to generate the feedback pattern.

In some embodiments, the feedback pattern includes turn-by-turn directions.

In some embodiments, the feedback pattern includes a tactile feedback pattern.

In some embodiments, the tactile feedback scheme includes a first device vibration when at least one of the electronic device or the mobile computing device is at a first distance from the item of interest and a second device vibration when at least one of the electronic device or the mobile computing device is at a second distance from the item of interest.

In some embodiments, each of the electronic device and the mobile computing device generates a feedback scheme for the same determined location of the item of interest.

In some embodiments, the system further comprises a computer server that receives and processes a request from the mobile electronic device for the location of the item of interest.

In some embodiments, the mobile computing device is paired with the electronic device, such that one of the mobile computing device and the electronic device is a master that receives and processes the location data for determining directions and a proximity to an item of interest, and the other of the mobile computing device and the electronic device is a slave that generates the feedback pattern in response to a communication received from the master.

In some embodiments, a location of the item of interest is determined by accessing an item allocation database or communicating with a radio frequency identification (RFID) object reporting location.

In some embodiments, the electronic device includes a wearable electronic device.

In some embodiments, the electronic device includes a tactile handle of a shopping cart or tactile device of a shopping basket that is electronically paired with the mobile computing device.

In some embodiments, the shopping cart is a self-powered shopping cart.

In another aspect, a method for navigating a shopper in a store comprises determining a location of an item of interest; forming an interaction between a wearable device and a mobile electronic device to receive navigation data regarding the item of interest; and generating a feedback scheme by at least one of the mobile electronic device and the wearable device from the navigation data, the feedback scheme providing an indicator of both a direction to the item and a proximity from the item.

In some embodiments, the method further comprises searching for the item of interest, comprising activating an application stored at and executed by the mobile electronic device to search for the item of interest.

In some embodiments, the method further comprises searching for an availability and a location of the item of interest; providing the feedback scheme as a customized feedback pattern for different directions or commands; providing a plurality of items including the item of interest, each of which has a location which is used to generate the feedback pattern; determining an availability and location of the item of interest; and comparing the location of the item of interest and the established location of the mobile electronic device to produce a distance result that is used to generate the feedback pattern.

In another aspect, a store navigation system comprises a search processor that searches for an availability and a location of the item of interest; a pattern generator that provides customizes the feedback pattern for different directions or commands; a shopping list processor that provides a plurality of items including the item of interest, each of which has a location which is used to generate the feedback pattern; a lookup module that determines an availability and a location of the item of interest; and a distance determination processor that compares the location of the item of interest and the established location of the mobile electronic device to produce a distance result that is used to generate the feedback pattern.

In some embodiments, the feedback pattern is provided to at least one of a mobile computing device or a wearable electronic device in communication with the mobile computing device.

In some embodiments, the mobile computing device is paired with the wearable electronic device.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill in the art that the systems and methods can be practiced without at least some of the details. In some instances, known features or processes are not described in detail so as to not obscure the present invention.

Features of embodiments of the present inventive concepts include a mobile computing device such as a smartphone or the like and a wearable electronic device such as wristband or the like that are paired together or otherwise communicate with each other to produce mechanical feedback such as tactile signals, in order to guide a shopper to a store item. In some embodiments, the mobile computing device is paired with the wearable electronic device, such that one of the mobile computing device and the wearable electronic device is a master that receives and processes the location data for determining directions and a proximity to an item of interest, and the other of the mobile computing device and the wearable electronic device is a slave that generates the feedback pattern in response to a communication received from the master. In some embodiments, only the mobile computing device is the master, since the mobile computing device is configured with GPS, WiFi positioning, or other location-determining technology. In other embodiments, the wearable device is paired with a smartphone or other user-provided mobile device which functions as a master by processing location data and so on and the wearable device functions as a slave device which generates feedback patterns or the like in response to communications with the master device. In other embodiments, the mobile computing device and wearable device establish a peer-to-peer communication, where each generates some or all of the feedback pattern. Navigating a user in this manner provides not only turn-by-turn directions, but also provides a proximity from the item of interest throughout the course of navigating the shopper. Leveraging two or more devices paired or joined together in this manner to transmit signals permits a shopper's navigation experience to be customized. For example, a computer watch worn at the left hand may generate tactile feedback when the shopper is to take a left turn, while the smartphone may generate a vibration when the shopper is to take a right turn.

Figure 1:
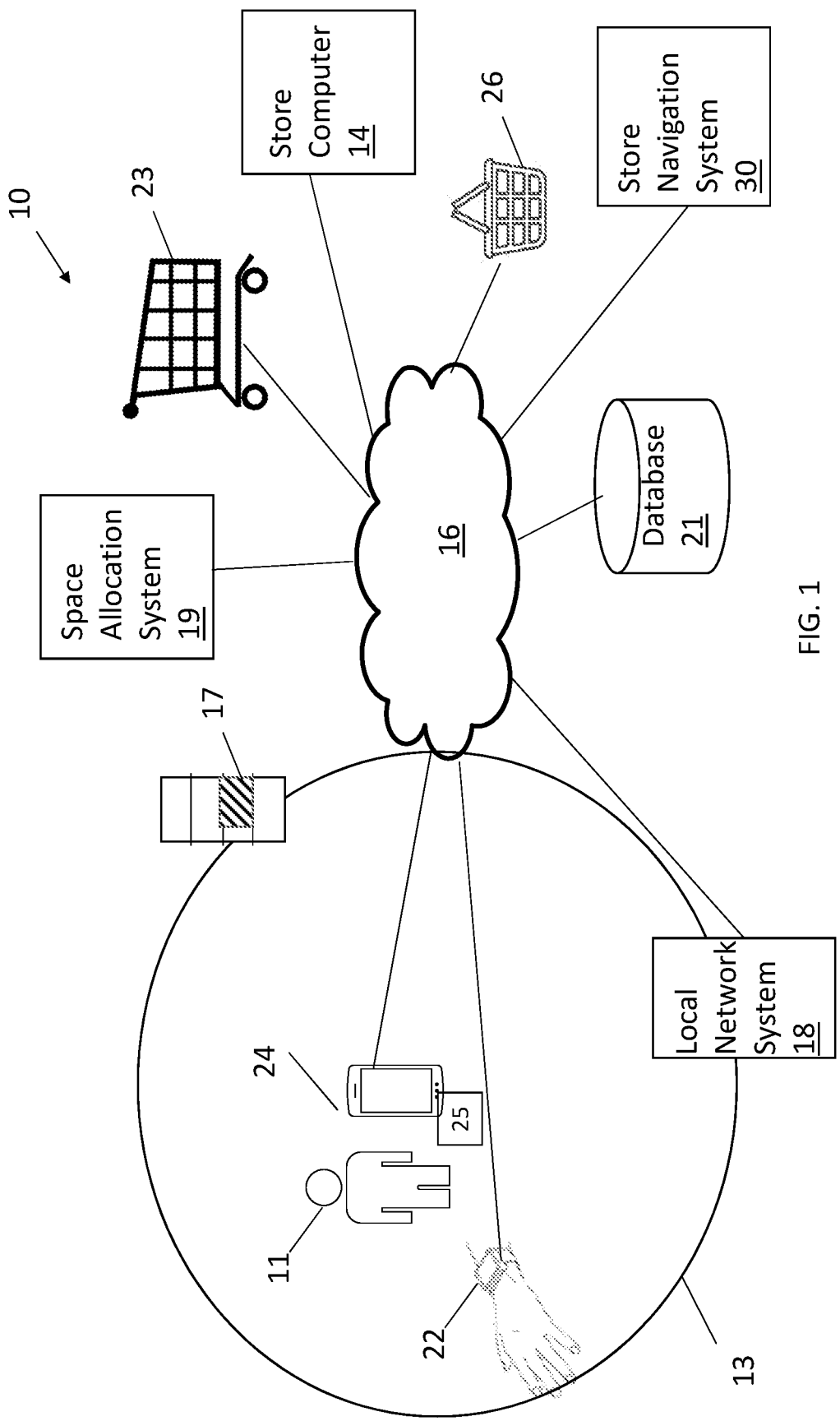
FIG. 1 is a diagram illustrating an environment including an electronic communications network at which embodiments of the present inventive concepts may be practiced.

FIG. 1 is a diagram illustrating an environment 10 including an electronic communications network 16 at which embodiments of the present inventive concepts may be practiced. The communications network 16 permits the various electronic devices of the environment to communicate with each other. The network 16 may be a public switched telephone network (PSTN), a mobile communications network, a data network, such as a local area network (LAN) or wide area network (WAN), or a combination thereof, or other communication network known to those of ordinary skill in the art.

The environment 10 may include a user 11 who is in possession of both a wearable electronic device 22 and a mobile computing device 24, each of which can communicate via a network 16 with a store computer 14, a local network system 18, a database 21, store navigation system 30, processor and tactile device-equipped shopping cart 23 and/or shopping basket 26. It is to be understood that the computer-based electronic devices of the environment 10, for example, store computer 14, a local network system 18, store navigation system 30, wearable electronic device 22, and/or mobile computing device 24 can take many forms and implementations, including hardware, software, or both. For example, the store navigation system 30 can be either physically at a store or a cloud-computing environment or other remote location from a store. In embodiments where hardware implementations are present, the hardware processors can be part of one or more special purpose computers that execute computer program instructions which implement one or more functions and operations of the elements of the environment 10.

The wearable electronic device 22 may be an off-the-shelf electronic device, for example, Apple Watch or other processor-based device having a display. The wearable electronic device 22 may include at least one wireless transceiver for communication with other electronic devices, for example, the store computer 14, location network system 18, and/or the mobile electronic device 24. The wireless transceiver may exchange communication signals with the other electronic devices according to a communication protocol or type, such as, but not limited to, radio frequency (RF), WiFi, Bluetooth, and so on. The wearable electronic device 22 may include a plurality of tactile feedback emitters that provide tactile feedback to the portion of the human body in a predetermined sequential order to direct a wearer of the band portion to the destination location. The tactile feedback emitters can generate at least one of vibration feedback, visual feedback, pressure feedback, or other haptic feedback.

The user 11 may desire to purchase one or more store items 17 but does not know the location of the items 17. The user 11 may be present in the store, or near the store, for example, at a parking lot. Elements of the environment 10 operate to direct the user 11 to the items 17. Another application may include a store employee, contractor, or other user to bring an item 17 to a store location such as a shelf.

For example, a store-owned or controlled mobile device such as an MC 40 mobile computer used by an associate may interface with a space allocation system 19 for re-stocking items. The associate may also wear computer watch such as an Apple Watch. The space allocation system 19 may store a map along with records identifying specific locations where to stock or restock store items. Here, the store allocation system may retrieve the item location data, process it, and output directions to the mobile computer and/or computer watch according to some embodiments, for example, described with reference to FIGS. 3 and 4.

Another application may include a store employee, contractor, or other user finding a customer in need for help for locating items. Similar to the previous example, an associate may have in possession a mobile store computer 24 and/or wearable device 22, and can direct a customer 11 to an item 17 of interest according to navigation information provided by the mobile store computer 24 and/or wearable device 22 in response to a communication between the space allocation system 19 and the store navigation system 30.

The store environment 10 may include one or more store computers 14, for example, servers, database devices, and so on, that perform well-known functions, for example, point of sale processing, inventory management, and so on, but this is not intended to be limiting. In some embodiments, the store computers 14 may be at external locations, but perform same or similar functions as a server physically present in the store, and may include routers, switches, servers, and/or other electronic devices to perform such functions remotely from the store. Alternatively, features otherwise provided by a store computer 14 may instead be available via the Internet, such as cloud computing services or other remote server services. In some embodiments, a store computer may include a database or the like for storing maps, navigation data, or the like which may be used by other elements of the environment 10 for performing features of the inventive concepts.

The local network system 18 may be constructed and arranged forms an in-store WiFi network or the like, e.g., to continue communication when the user 11 arrives and moves into the store. A local network system 18 may include one or more different devices, for example, devices providing WiFi, GPS, Bluetooth™, and so on. The local network system 18 may be constructed and arranged to form a geo-fence or the like, which may be configured as a radius around an indicated location point, and defined by appropriate physical or virtual boundaries, or a partial radius perimeter about the indicated location point.

Such location signals, e.g., WiFi signals or the like, generated by processor-based elements of the local network system 18 can be leveraged by the store navigation system 30, store computer 14, wearable electronic device 22 and/or mobile computing device 24 for determining a location, distance to the item 17, or related information. The location signals may also be used to communicate with both in-store and cloud services, for exchanging additional data such as meal recipes, reviews, etc. For example, RFID tags may be located on objects, and the location signals can be used to where the closest RFID tag is located. This permits the user 11 to locate a store product closest to the user as some products are in different locations in the store or misplaced, i.e., placed somewhere by another customer. In another example, Wi-Fi triangulation, GPS, or other related techniques may be used to locate which wearable device 22 is nearby, for example, when many users are shopping in the same region of the store.

In some embodiments, the store navigation system 30 processes location signals according to inputs received from a combination of the space allocation system 19 and RFID tags. For example, the space allocation system 19 may store a store map that includes a layout, and further include a set of records that identify locations in the map layout where items are to be stocked and/or are currently located. As described with reference to other embodiments, the store navigation system 30 may provide item location information to the wearable electronic device 22 and/or mobile computing device 24 based on the space allocation system 19. However, a store item that should be located at a particular shelf may instead be inadvertently or intentionally moved to a different shelf, and this move may not be known or otherwise identified in the space allocation system 19. Here, an RFID tag on the moved item may emit a signal, which is used by the store navigation system 30 to make corrections to the original navigation path and proximity to the item in view of its new location. In some embodiments, the system 30 can direct the user to the closest location among either RFID locations or standard locations.

Figure 2:
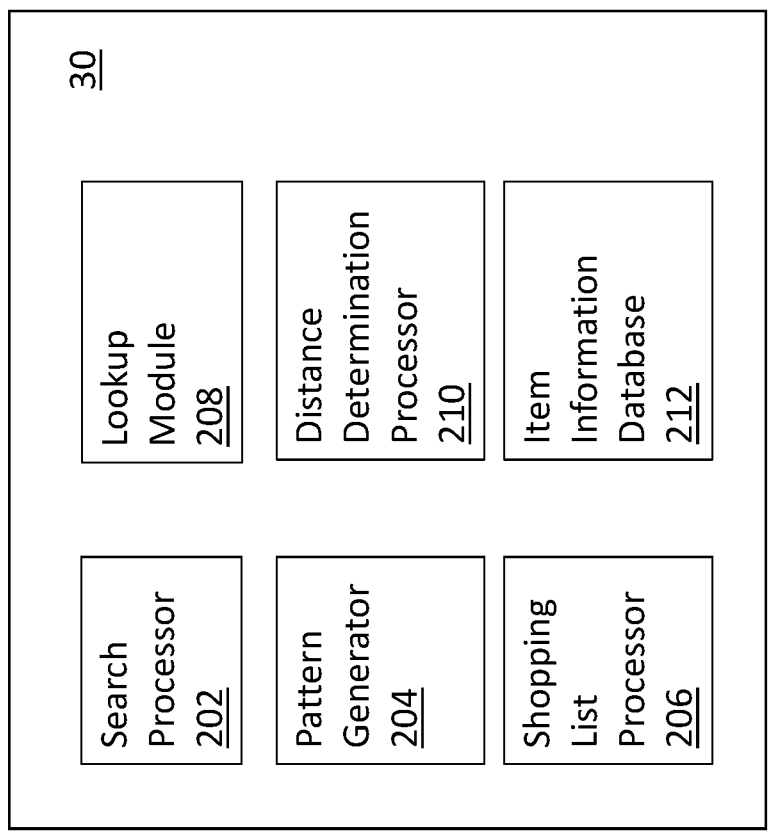
FIG. 2 is a block diagram of a store navigation system of FIG. 1, in accordance with some embodiments.

FIG. 2 is a block diagram of the store navigation system 30 of FIG. 1. As shown, the store navigation system 30 may include but not be limited to a search processor 202, a pattern generator 204, a shopping list processor 206, a lookup module 208, a distance determination processor 210, and an item information database 212. Some or all of the search processor 202, pattern generator 204, shopping list processor 206, lookup module 208, distance determination processor 210, and item information database 212 may be part of a same computer platform, or may be at different computer platforms and in communication with each other via the network 16. In some embodiments, some or all elements of the store navigation system 30 are stored and executed at the mobile device 24 and/or other personal computing device. In some embodiments, the item information database 212 is in communication with the store computer 14, the allocation database 21, or other related computer. The item information database 212 may include item details, such as price, expiration date, nutritional details, and so on. The allocation database 21 on the other hand may include location information related to the item.

The search processor 202 receives a request from an application 25 executed at a computer device, such as mobile computing device 24, requesting information regarding an item 17 of interest. In particular, this information may include a status of the item 17, for example, whether the item 17 is in inventory and available for sale at the store, and/or location information regarding the item 17. The search processor 202 may search for item availability and/or location information at the item information database 212 and/or other remote data repository such as store allocation database 21. In some embodiments, the item information database 212 includes location information regarding the item 17, and other information such as item availability or other inventory-related information and so on may be found elsewhere, such as the store computer 14. This external data may be retrieved by the search processor 202 and stored at the item information database 212 for future lookups. The physical location of the item 17 can be established by a store space allocation database 21 (see FIG. 1) that stores records of store products, including location data such as store, aisle, rack, and so on. For example, when a store associate stocks a shelf with a jar of peanut butter, a record may be updated and stored at the database 21 that includes the specific shelf location of the jar of peanut butter.

The pattern generator 204 can store data related to tactile feedback patterns, or more specifically, customized feedback signals, also referred to as a feedback scheme. For example, the user 11 can customize the receiving pattern of the signal such as speed of signals, range to start proximity changes, and signal transmission intensity. Feedback-related wave patterns or the like may be produced according to location information provided by the distance determination module 210, and/or feedback pattern data at the pattern generator 204. A feedback pattern can be user-generated, for example, entered in a user interface at the mobile computing device 24 and downloaded to the pattern generator 204. Thus, the pattern generator 204 may include a rules engine that is used to customize feedback signals for different directions and/or commands, for example, audio, visual, and/or tactile messages instructing the user to move in a particular direction.

A signal can be generated at a rate or frequency that increases as the user approaches the destination, for example, increasing pulses felt by the user's skin. For example, a signal corresponding to a "left turn" may be sent to the device 22, 24 from the pattern generator 204. In other embodiments, the feedback is interpreted directly at the mobile computing device 24 and/or wearable electronic device 22. In other embodiments, the feedback is received by or generated at the mobile computing device 24, which in turn is output to the wearable electronic device 22 for storage and processing at the wearable electronic device 22. Patterns can be unique to the device, for example, the wearable electronic device 22 may be configured to generate short pulses, while the mobile computing device 24 may be configured to generate vibrations of a longer duration that the pulses generated that wearable electronic device 24. In yet another example, a strength of a pattern pulse may be produced, for example, a tactile strength level from high to low. Thus, combinations of pattern type and strength and be offered. Other forms of feedback may be used to complement or replace tactile feedback, such as audio tones, light pulses, and so on, which are provided from the mobile computing device 24 and/or wearable electronic device 22.

The shopping list processor 206 may process a list of items of interest generated at the mobile electronic device 24 or other computing device. The item 17 of interest may be retrieved by the shopping list processor 206 determine its location, distance from the user 11, and direction information from the user 11 to the item 17. The user 11 can create a shopping list in ae mobile device, and the system 30 provides guidance to the user basis the route generated by the system using the shopping list. The wearable device 22 alone or in combination with the mobile computing device 24 may transmit vibration pulses or other feedback patterns to provide guidance to the user in the retail store.

The lookup module 208 may access the store computer 14 to determine whether the shopping list items, for example, item 17 is available. Item location data may be determined by the lookup module 208, and stored at the allocation database 21 and/or space allocation system 19 in communication with the allocation database 21. The lookup module 208 may also determine item location from an RFID tag or related emitting device located at the item 17.

The distance determination processor 210 processes data received from the mobile computing device 24 and local network system 18 to determine a location of the mobile computing device 24 relative to the item 17 of interest. In doing so, the distance determination processor 210 can establish whether the user 11 is moving closer to the item 17, or "hotter", or further way or "colder". The generated distance result may be provided to the pattern generator 204 and/or mobile computing device 24 for producing tactile feedback. In some embodiments, the distance determination processor 210 determines a location of the mobile computing device 24 relative to the item 17 of interest only if a determination is made that the item of interest 17 is indeed available, for example, stocked at the identified location. This can be determined by sensors, cameras, or the like that monitor the location for the presence of the item 17, or by a store computer 14 that includes inventory information regarding the item of interest 17, or by other electronic processing devices and/or techniques that establish whether or not the item 17 is at the location from which a distance from the mobile computing device 24 is calculated.

The store navigation system 30, or more specifically, the pattern generator 204, may include a database, matrix, or set of records that establish the type of feedback signal to be generated based on a determined distance from an item of interest. For example, when a determination is made that the user 11 is 100 feet from the item 17 of interest, the store navigation system 30 or the mobile computing device 24 may send a signal to the wearable electronic device 22 to produce three short vibration bursts in 5 seconds. When a determination is made that the user 11 is 50 feet from the item 17 of interest, the store navigation system 30 or the mobile computing device 24 may send a signal to the wearable electronic device 22 to produce five short vibration bursts in 5 seconds, and so on. In some embodiments, if a determination is made that the item of interest is not available, then the store navigation system 30 or the mobile computing device 24 may send a signal directly to the wearable electronic device 22 or to the mobile device which directs signals to the wearable device 22 in a master/slave or peer-to-peer relationship to produce a distinct tactile, audible, or other sensory response, for example, a single vibration bursts for 3 seconds indicating to the user that the item is not available.

Referring again to FIG. 1, as described herein, a user 11 at the store is in possession of a wearable electronic device 22 and a mobile computing device 24. The wearable electronic device 22 and mobile computing device 24 are each capable of exchanging wireless data with other computer-based electronic devices of the environment 10 when the mobile computing device is located at a particular location. The mobile computing device 24 can be a smartphone, handheld computer such as a tablet, or related device having a processor, memory, and display, and constructed and arranged for mobility, in particular, permitting the user 11, for example, an employee, to move about a store with the mobile computing device 24.

Stored in the memory of the mobile computing device 24 can include an application 25 that processes data for providing customized turn-by-turn instructions in the form of tactile feedback, and for communicating with the wearable electronic device 22. The application 25 may include a user interface for the shopper to select an item 17. This permits the user 11, for example, to select an option to navigate to the item 17 according to a user-specified pattern, for example, vibration for turn-by-turn signals, proximity to the item, and so on.

The wearable electronic device 22 may be constructed and arranged for positioning about a wrist (wristband), waist (belt), or other part of the body. For example, the wearable electronic device 22 may include a band portion for positioning about a wrist, waist, or other body part.

The wearable electronic device 22 may also include a plurality of feedback devices or nodes that abut the user's body so that the user 11 can receive tactile feedback, which may include impulses or other sensory-related feedback, for example, heat, pressure, vibrations, and so on, produced in a sequential order or wave pattern from the feedback devices indicative of a direction such as left, right, forward, backward, etc. and/or proximity for navigating the user 11 to an item 17 of interest, which is positioned in the store. The mobile computing device 24 may also include devices for providing feedback, such as vibrations and so on. The feedback may be provided in a sequential pattern, or wave, or frequency. For example, the wearable electronic device 22 and mobile computing device 24 are each configured to send patterns of pulses to the user 11. The user can configure the mobile computing device 24 and/or wearable electronic device 22 to generate custom signals for various directions and/or commands. For example, the mobile computing device 24 may be configured to vibrate indicating when the user 11 is to take a left turn, and the wearable electronic device 22 may be configured to vibrate indicating when the user 11 is to take a right turn. In another example, the wearable electronic device 22 may provide gentle thermoelectric heating or cooling, for example, the device 22 is warmer in the direction that the user 11 needs to go, and turns cooler away from where the user 11 needs to go.

The wearable device 22 may be configured to perform according to customized commands according to different approaches. For example, the user 11 may update settings at a user account stored at a data repository, which can be transmitted to the device 22 via WiFi, Bluetooth™ link, or other electronic communication. Instructions may be stored at a memory device at the wearable device 22, mobile computing device 24, or both.

A user may also customize the wearable electronic device 22 and mobile computing device 24 to establish how proximity feedback may be generated. As previously described, the pattern generator 204 in some embodiments may store this data and send instructions to the wearable electronic device 22 and mobile computing device 24 when to produce a particular pattern of tactile or mechanical pulses, vibrations, and so on may be generated as the user 11 moves closer to the item 17, while a different pattern may be generated as the user 11 moves farther from the item 17. In other embodiments, the pattern can be established at the wearable electronic device 22, mobile computing device 24, or a third-party device, such as a web services platform. Other feedback modifications may include but not be limited to speed of signals, range to start proximity changes, signal transmission intensity, and so on. Accordingly, a user 11 may receive turn-by-turn instructions via tactile feedback, while also receiving secondary feedback such as distance from the item 17.

Figure 3:
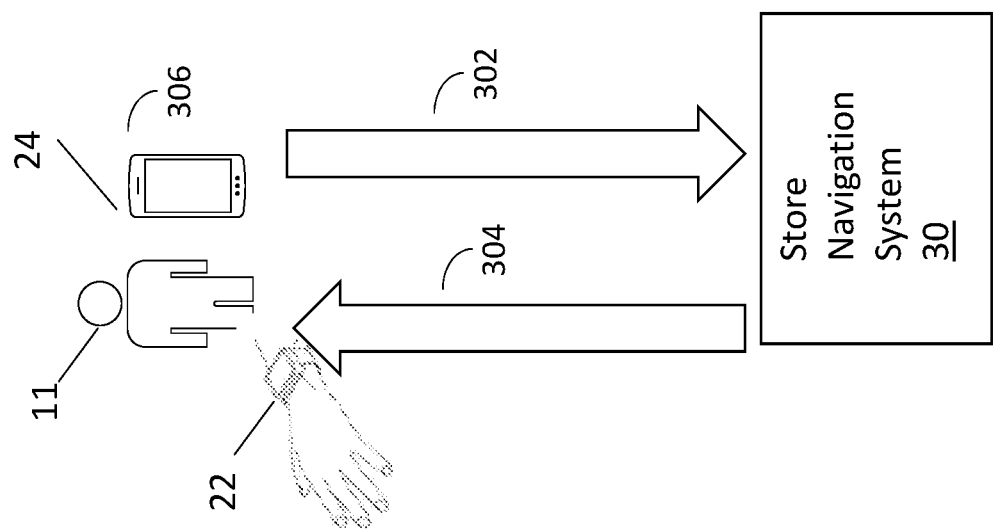
FIG. 3 is a diagram including data flow paths between a store navigation system and user electronic devices, in accordance with some embodiments.

FIG. 3 is a diagram including data flow paths between a store navigation system 30 and user electronic devices 22, 24, in accordance with some embodiments. The user electronic devices may include a wearable electronic device 24 and a mobile computing device 24.

A store customer may not know where to find an item 17 of interest in a store. In brief overview, the system may permit the customer to open an application 25 at the customer's mobile computing device 24, e.g., smartphone, laptop computer, and so on. In doing so, with respect to flow path 302, the application 25 is executed to search for and locate information regarding the item 17, such as its availability and its location in the store. The application 25 may search the space allocation database 21 and/or the space allocation system 19. Product information is output from the mobile computing device 24 to the store navigation system 30.

The store navigation system 30 can perform a lookup of the item 17 identified in the product information. The item's location may be determined from the lookup. For example, an item location can be determined via a space allocation database 21 or from a radio frequency identification (RFID) object reporting location. Here, a retail establishment may include detectors positioned throughout the store for detecting signals generated by RFID devices. The detectors and RFID tags may be used in some embodiments for reporting a location of an item and/or a shopping cart used by the customer 11 for determining a location of item 17, a customer 11, or both.

At flow path 304, directions are provided to the item 17 based on a result of the lookup, namely, location information regarding the item 17. In some embodiments, the store navigation system 30 provides the directions. The store navigation system 30 may access item location data from the database 21. Here, the database 21 may provide initial location information, which can be used by the device 24 to determine a best route from the user 11 to the item 17. In other embodiments, the mobile computing device 24 may use its native GPS navigation device and software for turn-by-turn directions.

The mobile computing device 24, local network system 18, and store navigation system 30 can communicate with each other to determine at step 306 a distance from the user 11 to the item 17 of interest. For example, web services may be used. In some embodiments, the mobile computing device 24 may communicate with the store computer 14 or remote computer server to retrieve initial route data, and to become a transmitting device, i.e., process the route data for output and activation by the wearable electronic device 22. As the user 11 moves, data is transmitted via GPS, WiFi, or other wireless communication to the store navigation system 30, which in response transmits back distance information The store navigation system 30 permits the location data regarding the item 17 to be converted into tactile feedback to direct the user from a current location to the item 17. Therefore, also at step 306, the device application 25 translates directions into vibration instructions, e.g., a user-selected pattern, mechanical feedback strength level, and so on, for locating an item 17 of interest in a store or other building location. This may be performed locally at the wearable electronic device 22 and/or mobile computing device 24. In other embodiments, the wearable electronic device 22 and/or mobile computing device 24 receives instructions from the pattern generator 204 for tactile feedback to be generated. Thus, the mobile device 24 and WiFi, geofencing, or related technology, and the store navigation system 30 may interact with each other to determine a distance to produce sensory data for the user to establish whether the user is moving closer to or farther away from the location of the item 17. The item 17 may be distinguished from other items, for example, on a shopping list stored electronically, by the tactile pattern output. In addition, multiple items may be along a path that the user takes to reach a selected item of interest. In doing so, the wearable electronic device 22 and/or mobile computing device 24 may generate different tactile patterns, i.e., the wearable electronic device 22 may produce a tactile pattern for the item of interest 17 currently identified by the shopping list processor 206, while the mobile device 24 outputs visual, audible, and/or tactile information informing the user 11 of other items along the user's path to the original item of interest 17. As shown and described in FIGS. 5 and 6, the shopping cart 23 and or basket 26 may also, or instead, be used to inform the user 11 of the location of the items 17.

Figure 4:
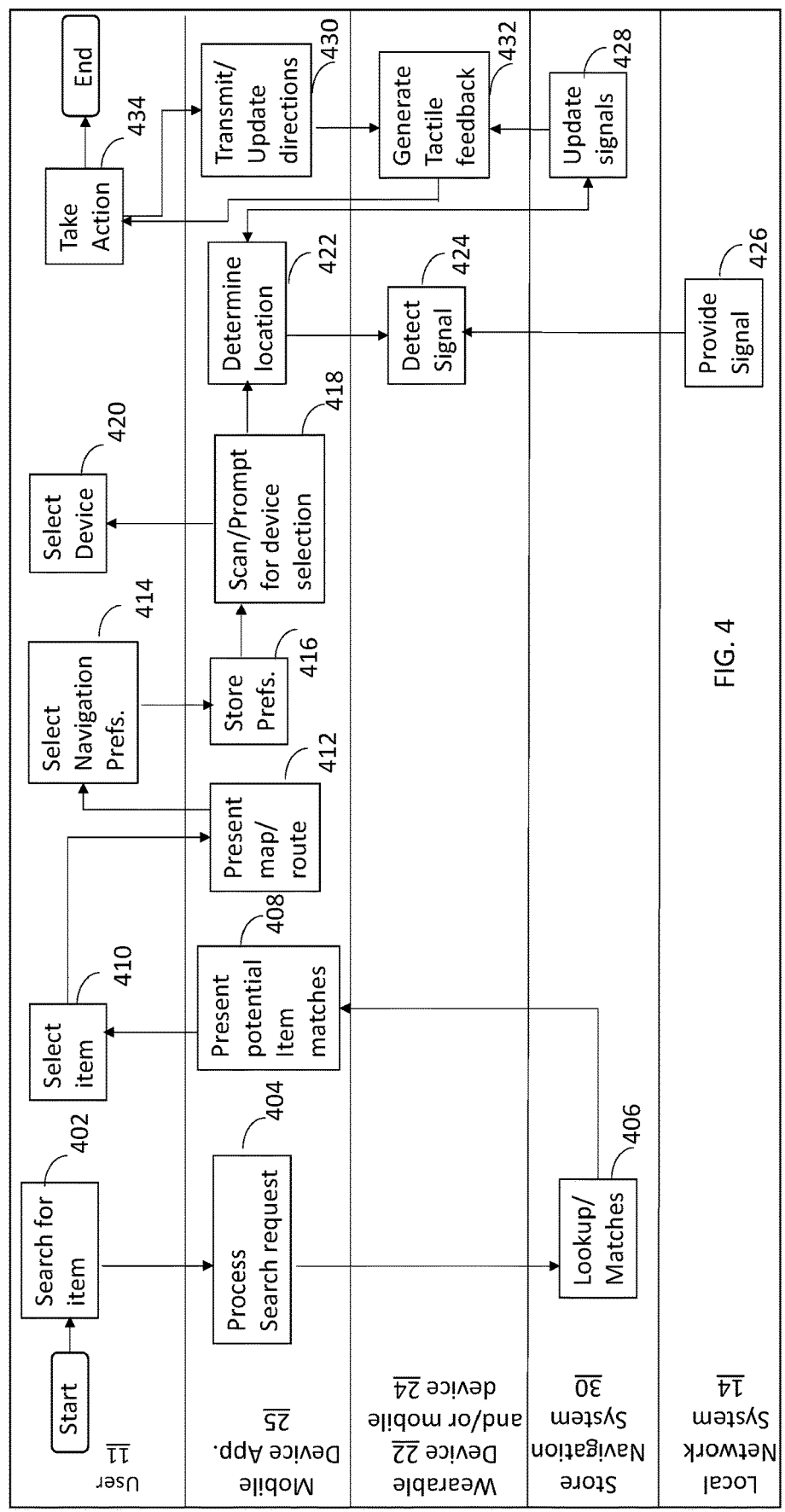
FIG. 4 is a flow diagram illustrating a method of navigation in a store, in accordance with some embodiments.

FIG. 4 is a flow diagram illustrating a method of navigation in a store, in accordance with some embodiments. In describing the method, reference may be made of elements of FIGS. 1-3.

At block 402, a search for an item of interest is performed. In particular, a user 11 may be interested in purchasing a product at the store. The user 11 may not know the location of the product. At block 404, the mobile device application 25 processes the search request. In doing so, the mobile device 24 outputs data regarding the search request to the search processor 202.

At block 406, the store navigation system 30 may perform a lookup, for example, accessing the store computer 14 to determine whether the item of interest and identified in the search request is available, and if so, determining a location of the item of interest. A lookup/match may be performed by a combination of the store computer 14 and store navigation system 30. An item information database 212 may include item availability data stored therein, so that when a lookup is performed against the item information database 212, location and availability can be determined. Route information may also be determined between a current location of the user 11 and the item of interest. For example, if an item includes an RFID tag or the like, the store computer 14 can act as an intermediary device, e.g., exchanging location and distance information. If beacons or the like are available, then a beacon can transmit a signal that can be interpreted by the mobile device 24. Alternatively, such information can be determined by a GPS locator with turn-by-turn features.

Also, at block 406, the store navigation system 30 may output potential product matches and route data to the mobile computing device 24.

At block 408, the mobile computing device 24 presents, for example, displays, potential product matches for selection by the user 11. At block 410, the user 11 selects an item 17 from the set of displayed product options At block 412, location information regarding the selected item 17 is presented to the user 11, for example, displayed at the user's mobile computing device 24. In some embodiments, the selected item 17 may be at multiple locations in the store. For example, the user 11 may select a bottle of laundry detergent that is stocked at three different locations in the store. As described herein, the store navigation system 30 may execute a process that establishes the closest of the three locations to where the user may be directed.

At block 414, the user 11 may provide navigation preferences, which are input to and processed by the mobile computing device 24. Navigation preferences may include but not be limited to turn-by-turn vibration formats, patterns, signal strength, and so on.

At block 416, the mobile computing device 24 stores a set of preferences. Examples of stored preferences may include but not be limited to: straight (one short pulse), back (one long pulse), right (two pulses), left (three pulses), {within a predetermined distance}, closer [stronger signal], and/or potential for extra level of granularity of proximity to turn.

At block 418, the mobile computing device 24 can scan and prompt for device selection (mobile or paired). For example, the mobile computing device 24 can perform an auto-detection function of devices that may be paired with the mobile computing device 24. Scan searching for other devices may include broadcasting, listening for communication signals, and so on. The some embodiments, the mobile computing device 24 can be paired with the wearable electronic device 22, for example, using Bluetooth™ connections or the like.

At block 420, the user 11 may select the device from a display on the mobile computing device 24 for receiving data for establishing the location of the item 17. The location data can be converted into tactile information, i.e., pulse patterns and the like, for example, in response to a communication between the pattern generator 204 and distance determination processor 210. In some embodiments where the wearable electronic device 22 and mobile computing device 24 are paired, the mobile computing device 24 may transmit a signal to the joined wearable electronic device 22 that translates the received signal to a pulse, e.g., a tactile signal. For example, the mobile computing device 24 can perform a GPS function that includes turn-by-turn navigation, and output a direction signal to the wearable electronic device 22 that responds accordingly, i.e., producing tactile or mechanical pulses or the like.

At block 422, the mobile device application 25 at the mobile computing device 24 determines a location via triangulation of signals and a known location of signal points, for example, using WiFi signals and/or other location-related data.

At block 424, the wearable electronic device 22 and/or mobile computing device 24 detects location data determined by the mobile computing device application 25 and also provided (block 426) by the local network system 14. In some embodiments, the mobile computing device 24 via a GPS device, WiFi triangulation, or the like can send the direction data to the wearable device 22, which in response can provide tactile feedback for navigating the user 11 to the item 17 of interest. In other embodiments, the wearable electronic device 22 can determine its own location, for example, including a GPS device, WiFi transmitter/receiver, or the like. Accordingly, location and/or directional data can be determined on either the wearable electronic device 22 and/or mobile computing device 24. Navigation may occur by a compass or accelerometer at the wearable device 22, and track the movements, for example, turns, made by the user 11 during movement toward or away from the item 17. In other embodiments, the wearable device 22 and/or mobile computing device 24 can include a position sensor, for example, GPS, WiFi, and so on, which can provide data to the store navigation system 30, which in turn continuously tracks the user's movements and provides direction information.

At block 428, the store navigation system 220 updates stored location-related signals, i.e. signals received from the mobile computing device 24 and local network system 14. The updated signals may be used to trigger the tactile feedback generated for informing the user 11 of the user's current location relative to the item 17 of interest, i.e., whether the user is getting "warmer" (closer) or "colder" (farther away) relative to the item 17.

At block 430, the mobile device application 25 translates or updates turn-by-turn directions based on a current location of the mobile computing device 24, for example, using GPS or other navigation technology of the mobile computing device 24.

At block 432, the wearable electronic device 22 and/or mobile computing device 24 generates tactile feedback in response to the location-related signals generated at block 428 and the turn-by-turn direction data generated at block 430. For example, one or both of the wearable electronic device 22 and/or mobile computing device 24 may vibrate in a predetermined pattern to indicate a type of direction, for example, turn left or turn right direction, and/or a current proximity to the item 17, for example, movement closer to or farther from the item 17.

At block 434, the user 11 may perform an action such as responding to an instruction via tactile feedback to turn in the appropriate direction. The wearable electronic device 22 and/or mobile computing device 24 communicates constantly each other and/or the system 30 to update location and feedback data, and steps 428, 430, 432, and 434 may be repeated, until the user 11 reaches the item 17.

Referring again to FIG. 1, a user may have the option of pairing the mobile computing device 24 with a processor-configured shopping cart 23, shopping basket 26, or the like, which may be enabled with vibration-producing or other tactile devices to provide feedback pattern providing an indicator of a direction to the item and/or a proximity from an item of interest.

Figure 5:
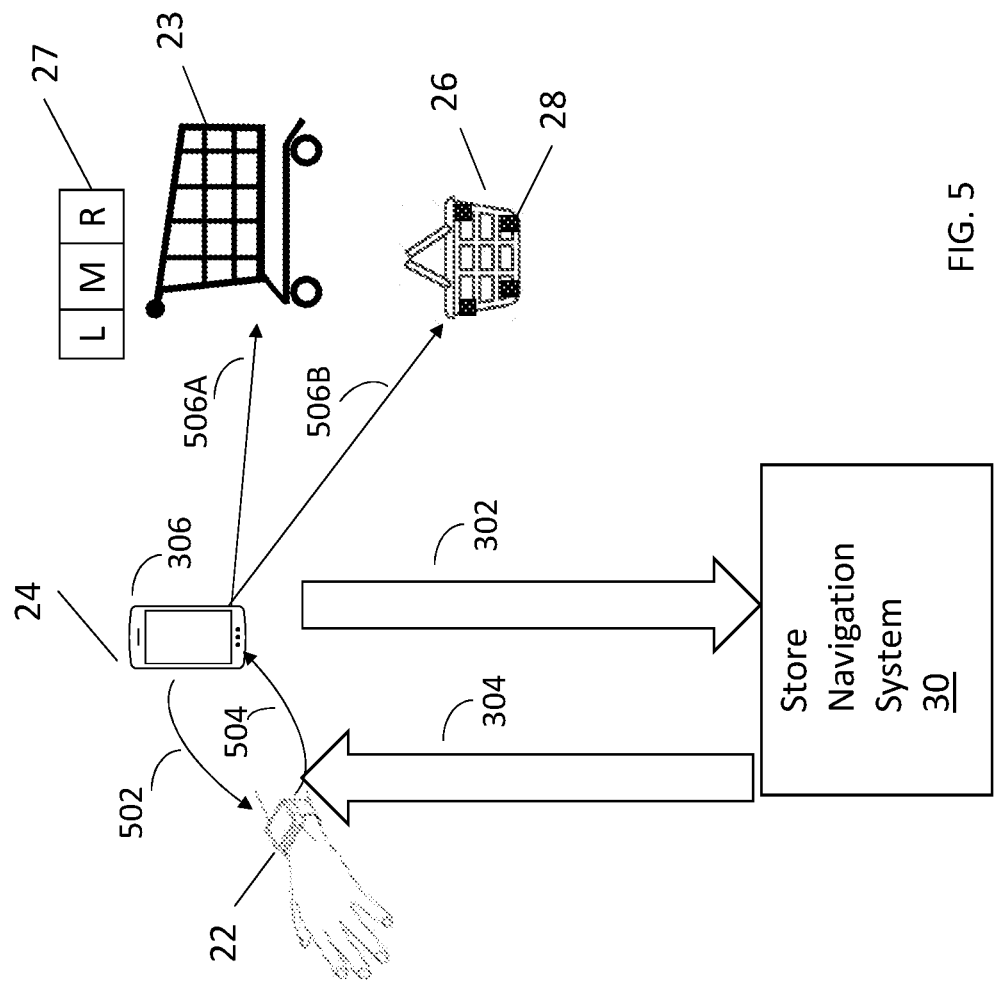
FIG. 5 is a diagram including data flow paths between a store navigation system, user electronic devices, and a shopping cart and/or basket in accordance with some embodiments.
Figure 6:
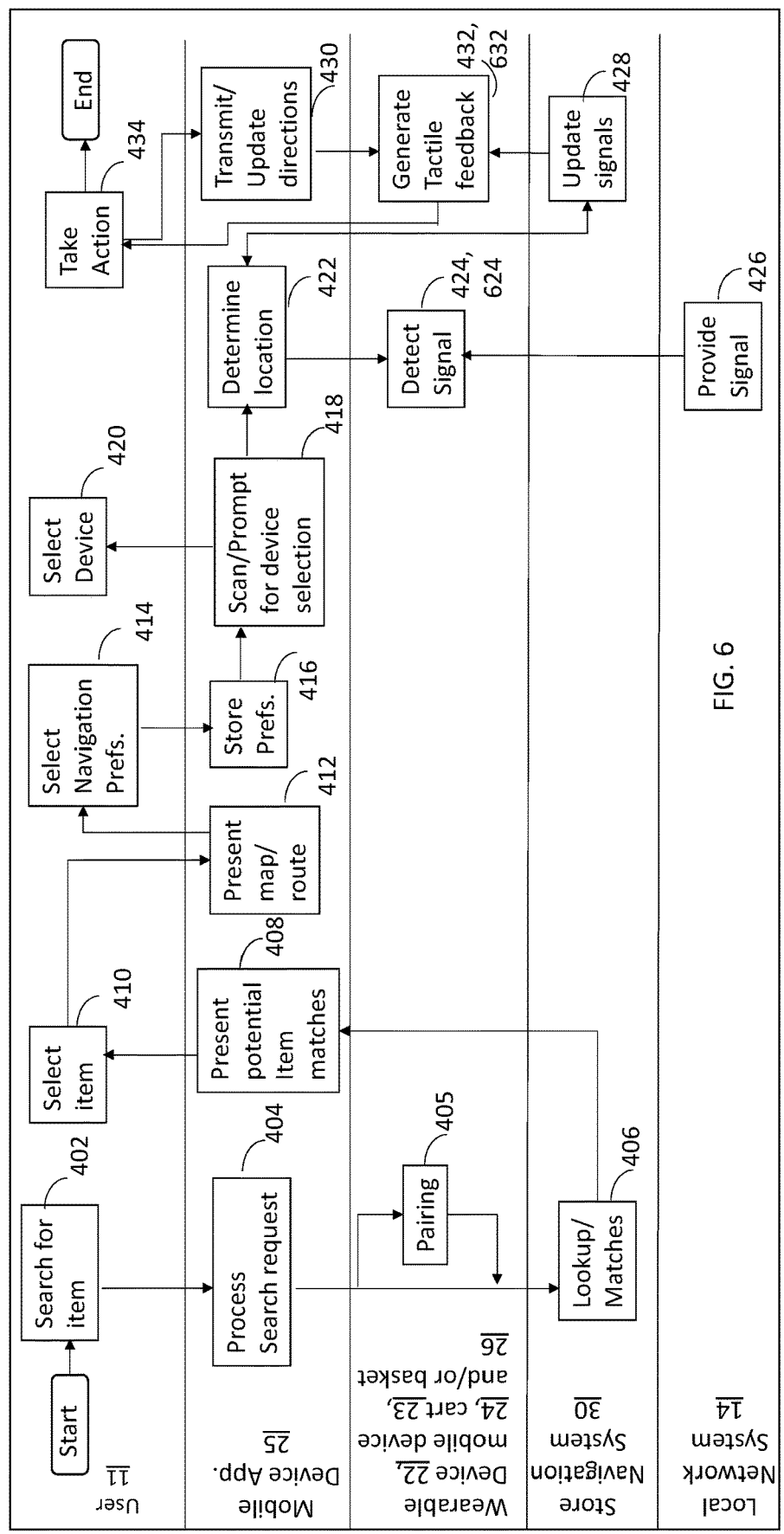
FIG. 6 is a flow diagram illustrating a method of navigation in a store, in accordance with some embodiments.

For example, as shown in FIGS. 5 and 6, i.e., flow arrow 506A, B in FIG. 5 or step 405 in FIG. 6, a shopper can select a button to pair the mobile device 24 using Bluetooth™ or other communication protocol to confirm the pairing. More specifically, in this example, the mobile device 24 at step 306 in FIG. 5 can communicate with the server to retrieve initial route data, then function as a transmitting device, whereby the mobile device 24 transmits route data or the like to the shopping cart 23 and/or tactile devices 28 coupled to a basket 26. The user can configure vibration patterns or the like for different directions, for example, controlling a tactile-generating handle bar 27 of the shopping cart 23 and/or tactile devices 28 coupled to the basket 26. Each may be divided into zones or other pre-arranged configurations to provide greater precision with respect to directing a user to a location of interest.

With further regard to the flow diagram of FIG. 5, the various flow paths 302-306 are similar to that described in FIG. 3 with the addition of the shopping cart 23 and/or basket 26 configured to communicate with the mobile computing device 24. For example, mobile computing device 24 may communicate with the store computer 14 or remote computer server to retrieve initial route data, and to become a transmitting device, i.e., process the route data for output to the shopping cart 23, which in response may activate its tactile-generating handle bar 27 accordingly, and/or basket 26 which may activate its tactile devices 28 accordingly.

With further regard to the flow diagram of FIG. 6, the general method is similar to that described in FIG. 4 with the addition of the shopping cart 23 and/or basket 26 configured to detect (624) signals related to location data determined by the mobile computing device application 25, in addition to or instead of the wearable device 22 and/or mobile computing device 24. In addition, the shopping cart 23 and/or basket 26 may be configured to generate (632) tactile feedback, in addition to or instead of the wearable device 22 and/or mobile computing device 24. The other method steps, i.e., block 402 and so on, are similar to those described in FIG. 4 and are not repeated for brevity.

In some embodiments, the shopping cart 23, basket 26, and/or other apparatus for transporting store items during a shopping experience may include batteries or the like for powering relevant electric devices, such as the tactile-generating handle bar 27, tactile devices 28, mobile computing device 24 via a removable connector such as a universal serial bus (USB) port, and so on. For example, the shopping cart 23 may include an electric charge circuit that generates a voltage in response to a rotational movement of the wheels of the shopping cart, and that uses the generated voltage to charge these electric devices, more specifically charging an electrical connection to an electronic device or the like directly from the power generator or from a battery, capacitor, or other charge storage device, for example, described in U.S. patent application Ser. No. 15/410,185 entitled "Shopping Cart Power Generation," the contents of which are incorporated by reference herein in their entirety.

Regardless of whether the shopping cart 23 is configured as a self-powered apparatus, the shopping cart 23 or basket 26 may operate as a thin client, i.e., by communicating with a relatively processor-intensive computing device such as the mobile electronic device 24 which in turn functions as or communicates with a computer server with respect to the shopping cart 23 or basket 26. Accordingly, when the mobile computing device 24 is paired with the shopping cart 23 and/or basket 26, the mobile computing device 24 in a client-server arrangement, the mobile computing device 24 can instruct the generating handle bar 27, tactile devices 28, and/or other electronic devices of the shopping cart 23 or basket 26 to operate accordingly, e.g., generate tactile signals in a predetermined manner.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While concepts have been shown and described with reference to specific preferred embodiments, it should be understood by those skilled in the art that various changes in form and detail may be made therein without departing from the spirit and scope as defined by the following claims.

What is claimed is:

1. A system for navigating a shopper in a store, comprising:
    a mobile device application that is stored at and executed by a mobile computing device;
    an electronic device in communication with the mobile device application, wherein the mobile device application receives and processes location data for determining directions and a proximity to an item of interest and processes a predetermined feedback pattern for use by the at least one of the electronic device and the mobile device application and generated according to an established location of the mobile electronic device, and wherein the feedback pattern is constructed and arranged to provide an indicator of both a direction to the item and a proximity from the item; and
    a store navigation system that provides instructions to the mobile device application for generating the feedback pattern, and the mobile device application in response establishes a communication with the electronic device to establish which of the electronic device and/or the mobile computing device generates the feedback pattern for indicating a type of direction for directing the shopper to the item of interest.

2. The system of claim 1, wherein the store navigation system comprises:
    a search processor that searches for an availability and a location of the item of interest;
    a pattern generator that customizes the feedback pattern for different directions or commands;
    a shopping list processor that provides a plurality of items including the item of interest, each of which has a location which is used to generate the feedback pattern;
    a lookup module that determines an availability and a location of the item of interest; and
    a distance determination processor that compares the location of the item of interest and the established location of the mobile electronic device to produce a distance result that is used to generate the feedback pattern.

3. The system of claim 1, wherein the feedback pattern includes turn-by-turn directions.

4. The system of claim 1, wherein the feedback pattern includes a tactile feedback pattern.

5. The system of claim 4, wherein the tactile feedback pattern includes a first device vibration when at least one of the electronic device or the mobile computing device is at a first distance from the item of interest and a second device vibration when at least one of the electronic device or the mobile computing device is at a second distance from the item of interest.

6. The system of claim 1, wherein each of the electronic device and the mobile computing device generates a feedback scheme for the same determined location of the item of interest.

7. The system of claim 1, further comprising a computer server that receives and processes a request from the mobile electronic device for the location of the item of interest.

8. The system of claim 1, wherein the mobile computing device is paired with the electronic device, such that one of the mobile computing device and the electronic device is a master that receives and processes the location data for determining directions and a proximity to an item of interest, and the other of the mobile computing device and the electronic device is a slave that generates the feedback pattern in response to a communication received from the master.

9. The system of claim 1, wherein a location of the item of interest is determined by accessing an item allocation database or communicating with a radio frequency identification (RFID) object reporting location.

10. The system of claim 1, wherein the electronic device includes a wearable electronic device.

11. The system of claim 1, wherein the electronic device includes a tactile handle of a shopping cart or tactile device of a shopping basket that is electronically paired with the mobile computing device.

12. The system of claim 11, wherein the shopping cart is a self-powered shopping cart.

13. A method for navigating a shopper in a store, comprising:
    determining a location of an item of interest;
    forming an interaction between a wearable device and a mobile electronic device to receive navigation data regarding the item of interest; and
    generating a feedback scheme by at least one of the mobile electronic device and the wearable device from the navigation data, the feedback scheme providing an indicator of both a direction to the item and a proximity from the item, wherein generating the feedback scheme comprises:
        receiving instructions by the mobile electronic device for generating a feedback pattern, and in response the mobile electronic device establishes a communication with the wearable device to establish which of the mobile electronic device and/or the wearable device generates the feedback pattern for indicating a type of direction for directing the shopper to the item of interest.

14. The method of claim 13, further comprising:
searching for the item of interest, comprising activating an application stored at and executed by the mobile electronic device to search for the item of interest.

15. The method of claim 13, further comprising:
searching for an availability and a location of the item of interest;
providing the feedback pattern of the feedback scheme as a customized feedback pattern for different directions or commands;
providing a plurality of items including the item of interest, each of which has a location which is used to generate the feedback pattern;
determining an availability and location of the item of interest; and
comparing the location of the item of interest and the established location of the mobile electronic device to produce a distance result that is used to generate the feedback pattern.

16. The method of claim 13, wherein each of the wearable electronic device and the mobile computing device generates a feedback scheme for the same determined location of the item of interest.

17. A store navigation system, comprising:
a search processor that searches for an availability and a location of the item of interest;
a pattern generator that provides a customized feedback pattern for different directions or commands;
a shopping list processor that provides a plurality of items including the item of interest, each of which has a location which is used to generate the feedback pattern;
a lookup module that determines an availability and a location of the item of interest; and
a distance determination processor that compares the location of the item of interest and the established location of a mobile electronic device to produce a distance result that is used to generate the feedback pattern, wherein the feedback pattern is provided to at least one of the mobile computing device or a wearable electronic device in communication with the mobile computing device, the store navigation system providing instructions to the mobile device application for presenting the feedback pattern, and the mobile device application in response communicates with the electronic device to establish which of the wearable electronic device and/or the mobile computing device generates the feedback pattern for indicating a type of direction for directing the shopper to the item of interest.

18. The system of claim 17, wherein the mobile computing device is paired with at least one of the wearable electronic device, a shopping cart, or a shopping basket.

* * * * *